(No Model.)
A. J. HUNT.
FODDER LOADER.
No. 558,179. Patented Apr. 14, 1896.
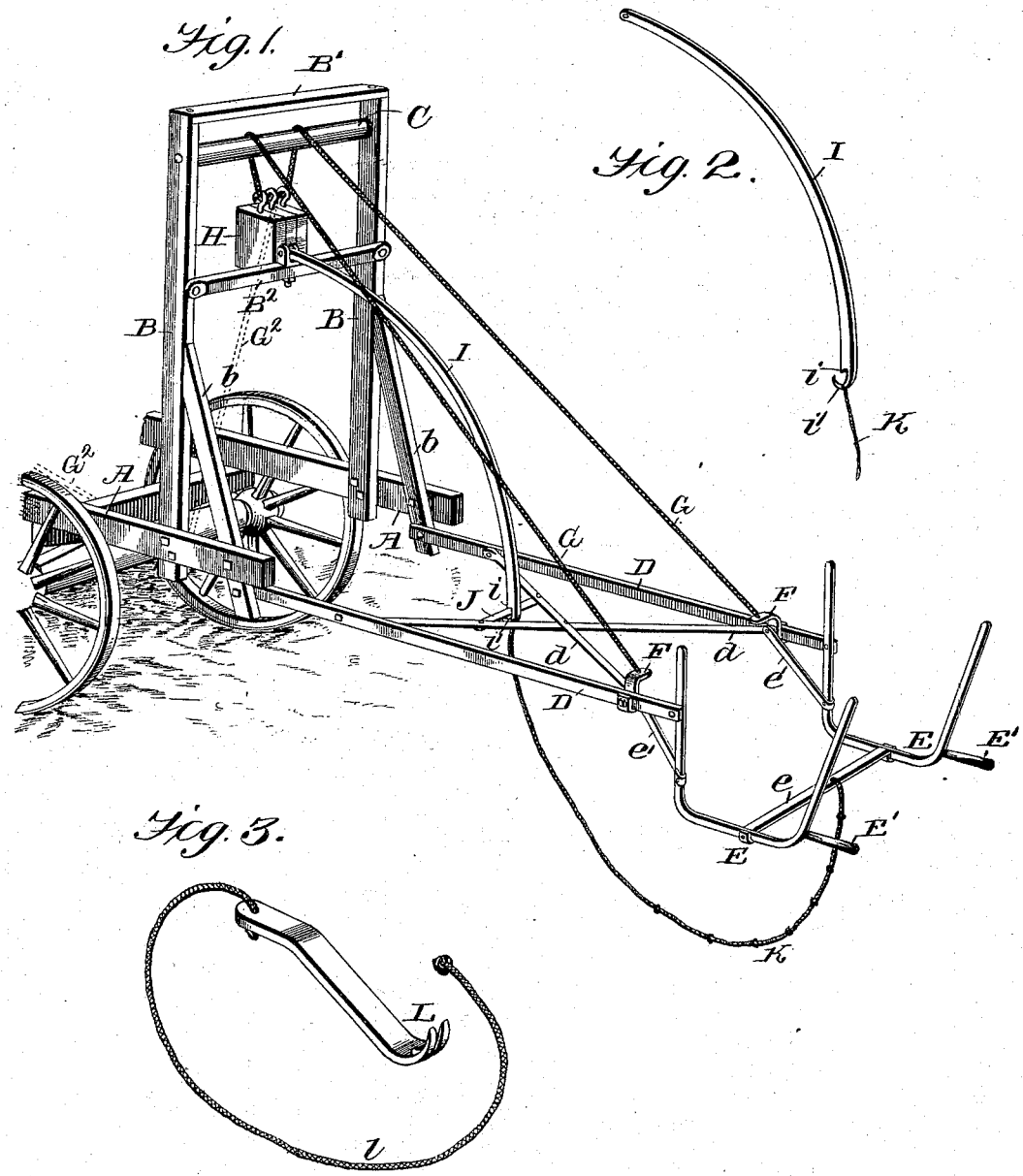
WITNESSES
Jos. C. Stack.
James R. Mansfield.
INVENTOR
Aaron J. Hunt.
By Alexander & Dowell
Attorneys.

UNITED STATES PATENT OFFICE.

AARON J. HUNT, OF HIAWATHA, KANSAS.

FODDER-LOADER.

SPECIFICATION forming part of Letters Patent No. 558,179, dated April 14, 1896.

Application filed January 23, 1896. Serial No. 576,553. (No model.)

*To all whom it may concern:*

Be it known that I, AARON J. HUNT, of Hiawatha, in the county of Brown and State of Kansas, have invented certain new and useful Improvements in Fodder-Loaders; and I do hereby declare that the following is a full, clear, and exact description thereof, reference being had to the accompanying drawings, and to the letters of reference marked thereon, which form part of this specification.

This invention is an improved loading attachment for wagons, and is especially designed for handling corn-fodder, cane, &c.

It consists in the construction and combination of parts summarized in the claims, and the best form of apparatus now known to me is constructed as hereinafter described, and illustrated in the accompanying drawings, in which—

Figure 1 is a perspective view of the loader attached to the body of a wagon. Fig. 2 is a detail of the latch. Fig. 3 is a detail of a fodder-tie.

A A designate the side beams of the body of a hay or fodder wagon frame, which project in rear of the rear axle. To these bars are bolted uprights B B, connected at top by cross-piece B' and stiffened by braces $b\ b$, as shown. A roller C is journaled in the uprights just below cross-piece B'.

The lower ends of braces $b$ depend below the bars A A, and to them are pivoted by any suitable means the side bars D D of the swinging loading-frame, said side bars D D being connected by X-braces $d\ d$, as shown. To the free ends of bars is fastened a rack formed, as shown, of U-shaped pieces E, connected by a cross-piece $e$.

$e'\ e'$ are braces between the end pieces E and the side bars D.

Ropes G are attached to metal clip-pieces F, secured to bars D near the rack, said ropes running over the roller C and connected to weights H, as shown in full lines, Fig. 1. The same bolts that secure clips F in place may also secure the adjoining ends of braces $d$ and $e'$, as indicated in the drawings.

I designates a curved latch which is pivoted at its upper end to a cross-piece $B^2$, attached to uprights B. The lower end of the latch has a notch $i$, which is adapted to engage a cross-piece J, secured to and between the X-braces $d$, as shown. The lower end of the latch is hooked, as at $i'$, so as to catch and prevent the loading-frame dropping too far.

One end of a rope K is attached to the cross-bar $e$ and knotted to facilitate pulling down the frame when raised. The other end of the rope is attached to the latch-bar, so that it can be tripped when desired to let the frame rise.

The weight H is preferably made in sections, each provided with a hook, so that the total weight can be approximately adjusted to suit the material being loaded.

In using the machine the loading-frame is lowered to the position shown in Fig. 1, latch I engaging piece J and holding it down. Then the rack is filled with fodder. Then, by a pull on rope K, latch-bar I is disengaged from piece J and the weights drop, raising the loading-frame and lifting the fodder up over the cross-piece B', where it drops upon the wagon-frames in correct position for loading without turning or handling.

Handles E' are fastened to the pieces E, so that the operator can start the load up, if necessary, by lifting thereon until the weights overcome the gravity of the load. When empty, the loader is pulled down by rope K until latch I locks it in lowered position.

Instead of employing weights horse or other power may be used to lift the loading-frame. To do this, ropes G would be connected to a rope $G^2$, (indicated in dotted lines, Fig. 1,) which would be led to the point of power, so that a pull on rope $G^2$ would act on ropes G just as the weights H would.

For convenience in loading I propose to tie the fodder into bundles before dropping them into the frame, and for convenience in doing so the tie illustrated in Fig. 3 may be used. This consists of a bifurcated hook L, to which a rope $l$ is attached.

In use an armful of fodder is picked up, then the tie slipped around and secured by catching the knotted end of the rope in the bifurcation of the hook. A suitable number of these ties may be provided to bundle up an entire load.

By means of my improved loader the heavy fodder, cane, &c., can be expeditiously and properly loaded with great facility and little labor.

The loader can be attached to ordinary hay-frames on farm-wagons, as it does not require any special construction of frames.

Having thus described my invention, what I therefore claim as new, and desire to secure by Letters Patent thereon, is—

1. In a loader, the combination of the wagon-frame, the loading-frame pivoted to the rear end thereof, said loading-frame consisting of opposite side bars suitably connected, and a rack attached to the free end of said bars; with a pivoted latch for locking said frame in lowered position, and means for raising said loading-frame, all substantially as and for the purpose described.

2. In a fodder-loader, the combination of the wagon-frame, the uprights attached thereto, the loading-frame consisting of parallel side bars, U-shaped pieces attached to the free ends of said bars, and suitable braces, and connecting-pieces; with means for locking said loading-frame when lowered, and means for raising it when released, substantially as described.

3. In a fodder-loader, the combination with the wagon-frame, the swinging loading-frame connected thereto; the curved latch I having a hooked and notched end and adapted to lock said loading-frame when lowered, and means for raising said loading-frame, all substantially as and for the purpose described.

4. In a loader, the combination of the wagon-frame, the uprights fastened thereto, and the loading-frame consisting of side bars D, D, the X-braces, the U-shaped pieces E attached to the free ends of the side bars, and the transverse piece J; with the curved latch I, the roller journaled in and between said uprights, and the ropes attached to said loading-frame and running over said roller, for the purpose and substantially as described.

5. The combination of the uprights B, B, and their braces $b$, $b$, attached to a wagon body or frame; the roller C journaled in said uprights; a loading-frame consisting of the side bars D, D, pivoted to the lower ends of the braces $b$, the X-braces between the side bars, the piece J fastened to said X-braces; the U-shaped piece E fastened to the ends of pieces D, the braces $e'$, the cross-piece $e$; with the latch I, pivoted to a cross-piece $B^2$ attached to the uprights; clips F attached to bars D, the ropes G attached to said clips and running over the roller, and means whereby said ropes are caused to lift the loading-frame when the latch is released, substantially as described.

In testimony that I claim the foregoing as my own I affix my signature in presence of two witnesses.

AARON J. HUNT.

Witnesses:
O. J. WASHBURN,
L. S. HERBERT.